United States Patent Office 3,515,407
Patented June 2, 1970

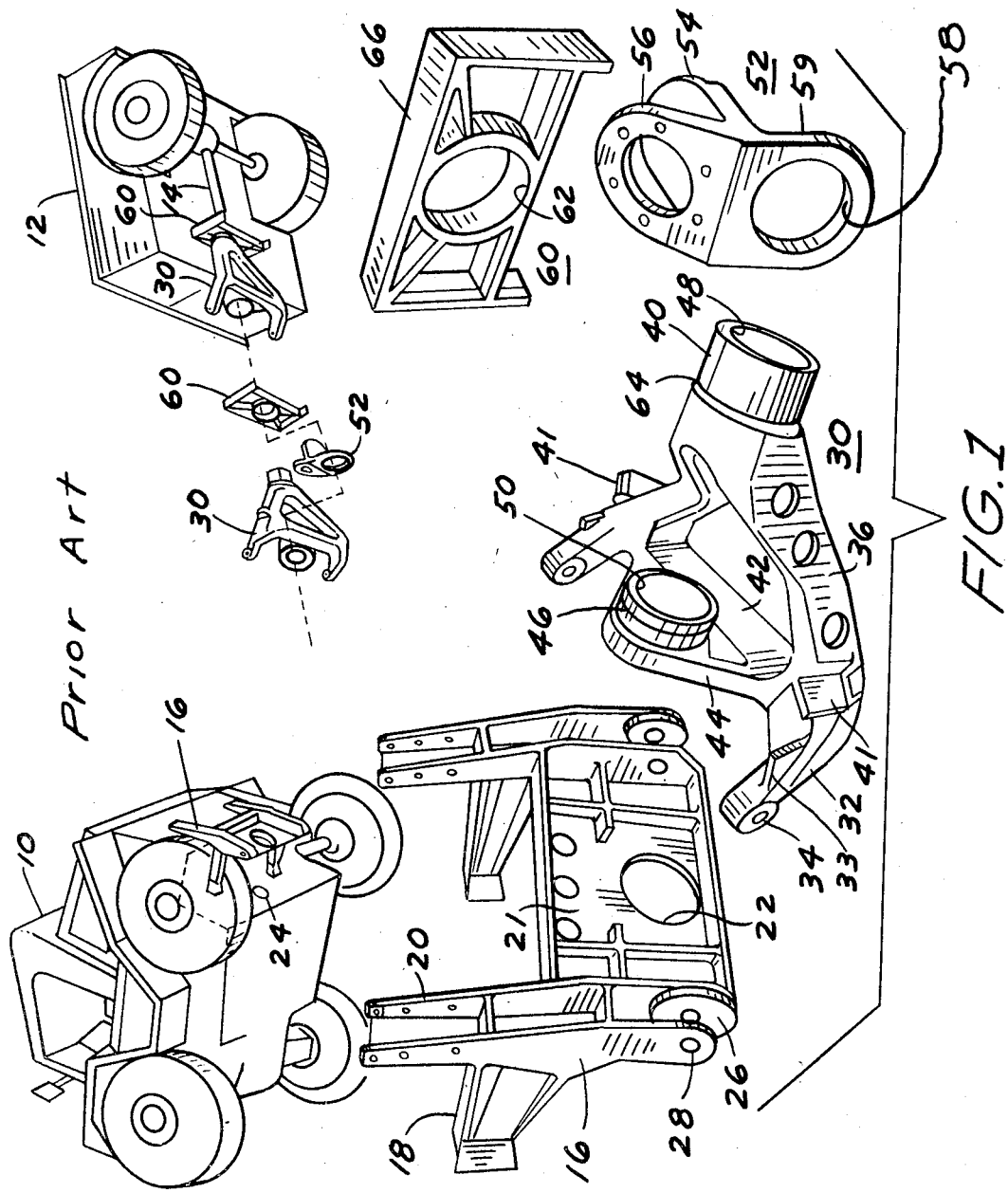

3,515,407
TORSILASTIC MOUNTED ARTICULATION JOINT
Robert E. Zimmerman, Berkley, Mich., assignor to the United States of America as represented by the Secretary of the Army
Filed Nov. 9, 1967, Ser. No. 683,432
Int. Cl. G60d 1/08
U.S. Cl. 280—400        7 Claims

ABSTRACT OF THE DISCLOSURE

A bearing assembly which has concentric sleeves between which a flexible bushing means is secured. The radially innermost sleeve is secured to a coupling which connects forward and rear vehicle bodies. The coupling has a yoke member which is rotatably mounted on the forward vehicle body. The radially outermost sleeve is connected to and supports the rear vehicle body, either directly or indirectly through support mounts. The bearing assembly permits limited rotation of the rear body about its longitudinal axis relative to rotation of the forward body without any rubbing surfaces being subject to wear.

---

The invention described herein may be manufactured, used, and licensed by or for the Government for governmental purposes without payment to me of any royalty thereon.

This invention relates to a bearing assembly. More particularly this invention relates to a bearing assembly which is utilized to prevent wear of members which rotate relative to each other. Still more particularly, this invention relates to a bearing assembly which has no rubbing parts and which is adapted to permit rotational movement of two vehicle bodies relative to each other while minimizing wear of parts and material.

In the past articulated vehicles have been designed which permit rotation of one of the vehicle bodies relative to another vehicle body. These vehicles were provided with means for implementing rotation of the carrier body portion of the vehicle relative to the forward body portion of the vehicle, on an axis identical to or parallel with a longitudinal axis of the forward portion of the vehicle, while simultaneously providing for the transmission of power from the forward body portion to the carrier body portion. The prior art device which joined the two vehicle bodies permitted rotation of one body relative to another with a minimum of torsional stress within the joining means. This prior art device, frequently referred to as a joint, was originally designed without the use of any type bearing (running steel against steel). This device proved unsatisfactory because during operation of the vehicle in muddy terrain, and as a result of contamination, severe wear of the joint was encountered. Subsequent devices have provided for a sintered metal bearing element with provisions for lubrication. This resulted in some marginal improvement but the device was still subject to contamination, wear, and ultimate failure.

According to the present invention, a torsilastic bearing system is provided which eliminates the wear between parts of the vehicle which rotate relative to each other by elimination of the rubbing surfaces. According to the present invention, a new and improved bearing assembly is inserted between the carrier body and the yoke assembly which connects the forward vehicle body and the carrier body.

The present invention provides for a plurality of concentric metal sleeves between which are sandwiched flexible rubber bushings which are secured to the sleeves in any conventional manner such as by means of an interference fit or by a bonding material. The inner sleeve is anchored and acts as a stationary portion of the bearing system during rotation of the outer sleeve and the carrier body. The inner sleeve is secured to the yoke member of the articulating joint which connects the forward and carrier bodies. Angular deflections of the carrier body are directly relative to those of the yoke. Although one bearing may be used individually, two of these bearings are generally used per each vehicle. If desired, of course, the system may be adapted to incorporate any number of such bearings.

It is accordingly, an object of this invention to eliminate the aforementioned disadvantages of the prior art systems.

It is another object of the present invention to totally eliminate bearing wear in an articulation joint.

It is another object of the present invention to eliminate bearing wear in a coupling member which connects to bodies which are rotatable with respect to each other.

It is still another object of the present invention to provide for improved side slope stability of an articulated vehicle.

It is yet another object of the present invention to provide for improved swimming stability of an articulated vehicle.

Another object of the present invention is to provide for the cushioning of the thrust loads on the articulation joint which connects two vehicle bodies.

Other objects and advantages of the present invention will become apparent to those of ordinary skill in the art by the following description when considered in relation to the accompanying drawings of which:

FIG. 1 is an exploded view of an articulated joint in disassembled and assembled relation as previously known in the prior art.

Figure 3:
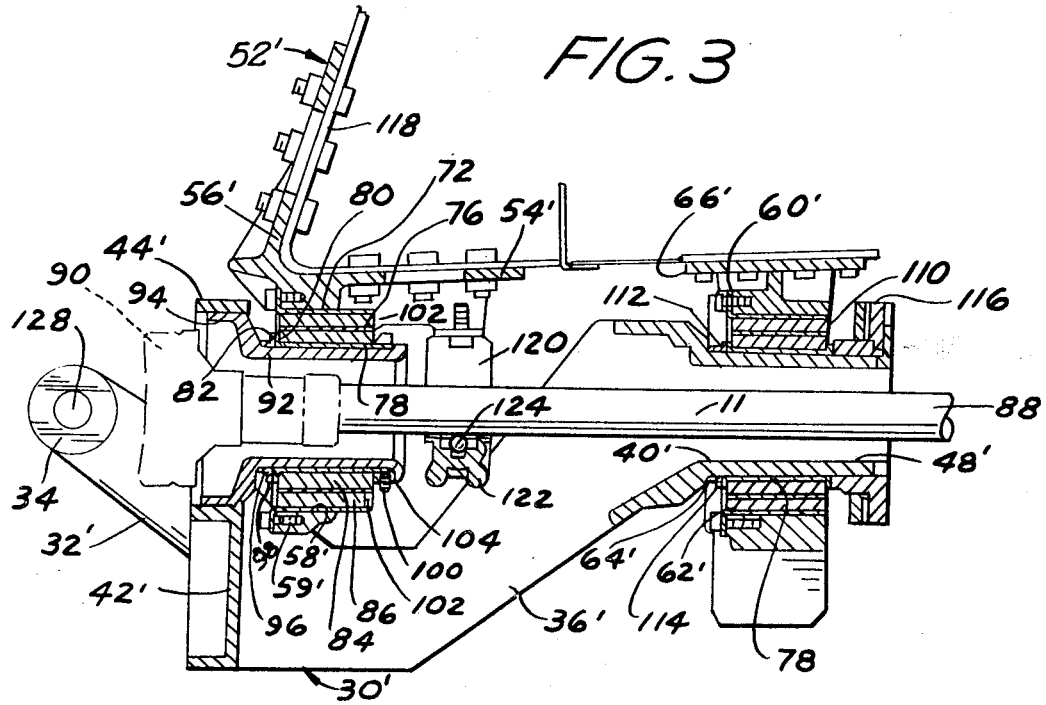
FIG. 3 is a cross-sectional view of the new and improved articulation joint which incorporates a bearing assembly, according to the invention.

Referring now to the drawing, wherein like numerals will refer to similar parts in the various figures, FIG. 1 is representative of the prior art systems. Reference numeral 10 generally indicates the forward portion of the vehicle, commonly known as the "cab" portion of the vehicle. Attached to the cab portion 10 is a carrier body or trailer 12. The two vehicle bodies may be driven solely by the forward vehicle body 10 or, if desired, power may be transmitted to the carrier body by means of drive shaft 14. Drive shaft 14 extends through aperture 22 placed in the cab 10, supplying driving power for the wheels of carrier body 12. Mounted on cab 10 via means of support arms 18 is support bracket 16. Vertical arms 20 are provided to connect support bracket 16 to the rear of cab 10. Vertical arms 20 are comprised of channel like members terminating in portion 26 which has an aperture 28 bored therein. Center plate 21 has an aperture 22 formed therein through which drive shaft 14 passes. Vertical support arms 20 are welded to either side of center plate 21. If desired, of course, vertical support arms may be formed as an integral part of center plate 21. A pair of stops, not shown, which are made of any suitable material such as rubber are mounted on vertical support arms 20 to restrict the amount of movement about the pitch axis. If rotation about the pitch axis is too great, these stops will engage a portion of body 12.

The main portion of the articulation joint for the coupling member is a yoke member, designated generally at 30. Yoke 30 has a pair of oppositely disposed arms 32 which terminate in portions 34. Portions 34 are rotatably mounted on support brackets 16 as shown at 26.

Attached to the straight arms 32 are slanted arms 36 which terminate in cylindrical portion 40. Stops 41 are also provided on support arms 32 to restrict the amount of rotation about the roll axis. If the rotation about the roll axis is too great, stops 41 will engage a portion of carrier body 12 and thereby restrain movement of yoke 30. A cross member 42 is provided to increase the rigidity of the yoke. As an integral portion of the yoke, inclined arms 44 which terminate in cylindrical portion 46 are also provided. As can be seen in the drawing, a bore 50 is provided in cylindrical portion 46 and a bore 48 is provided in cylindrical portion 40 to enable driveshaft 14 to pass from the carrier body to the forward vehicle body.

The prior art device shown in FIG. 1 utilizes a brace 52 in which cylindrical portion 46 is journaled. Brace 52 is provided with a platform portion 54 and a backing portion 56 which were utilized for the carry body. Transverse portion 59 is provided with aperture 58 to enable cylindrical portion 46 to be rotatably secured therein. This prior art device, therefore, provided for a direct metal to metal contact between brace 52 and yoke 30. This obviously was a very high friction mechanism which resulted in extremely high wear of both the brace and the cylindrical portion 46 of the yoke 30.

A mounting bracket 60 was provided in this prior art device to secure cylindrical portion 40 to yoke 30. Mounting brackets 60 may be cast or otherwise suitably formed with an aperture 62 formed therein. Cylindrical portion 40 of yoke 30 fits snuggly within aperture 62. This prior art structure therefore, also results in an extremely high abrasive bearing system in that a direct metal to metal contact bearing is utilized. Mounting bracket 60 is provided with a flat portion 66 on which carrier body 12 is mounted.

The individual components are shown in both disassembled and assembled relation in FIG. 1. As mentioned previously, brace 52 bears directly on cylindrical portion 46 and mounting bracket 60 bears directly on cylindrical portion 40. This enable the forward body 10 to rotate relative to carrier body 12 freely and without restriction. This prior art system has eliminated much of the torsional stress, however, it has the disadvantage of extreme wear at the interconnection betwen brace 52, mounting bracket 60, and yoke member 30.

Figure 2:
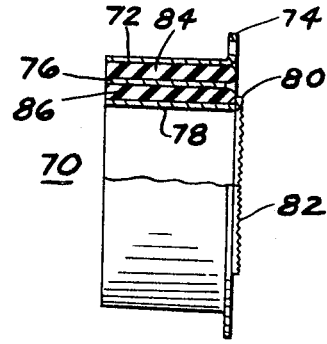
FIG. 2 is a cross-sectional view of the bearing assembly, according to the present invention.

FIG. 2 represents the bearing assembly which eliminates the aforesaid mentioned bearing problems. The bearing assembly is indicated generally at 70 and is shown partly in section. The bearing assembly, according to the invention, is provided with a series of concentric sleeves as shown at 72, 76 and 78. Sleeve 72 is provided with a transverse flange 74 having suitable bolt holes formed therein for mounting as will be described hereinafter. Sleeve 78 is also provided with a flange which is slightly axially displaced from flange 74 as shown in the drawing. Flange 80 is provided with serrations 82 which serve to keep the bearing 70 from rotating in a manner which will be described hereinafter. Securely mounted intermediate sleeves 72, 76 and 78 are bushings 84 and 86. Bushing 84 is rigidly secured between sleeves 72 and 76 by means of an interference fit or suitable bonding means. Similarly, bushing 86 is rigidly secured between sleeves 76 and 78 by means of suitable bonding or an interference fit. Bushings 84 and 86 may be formed of any suitable flexible material such as natural rubber. Sleeves 72, 76 and 78 are formed of any suitable material such as carbon steel. As may be described hereinafter, inner sleeve 78 will be fixedly mounted to yoke member 30 while outer sleeve 72 will be fixed to the carrier body 12. If desired, of course, single bushing 84 may be utilized individually and thereby eliminate the need for intermediate or metal sleeve 76 and bushing 86. On the other hand, if desired a larger number of sleeves and corresponding bushings may be also utilized depending upon the requirements of the particular system. In general, the greater the number of bushings and sleeves of a given size, the greater will be the permissible deflection. On the other hand for a given envelope of dimensions, the permissible deflection will be inversely proportional to the number of bushings and sleeves. As can be further seen from the drawing, there are no abrading surfaces in bearing 70. As the rotatable member which is attached to sleeve 72 rotates, sleeve 78 will remain stationary, and only the rubber bushings 84 and 86 will deflect. There will, however, be no rubbing surfaces which are subjected to wear within the bearing assembly as in the prior art devices.

FIG. 3 represents the coupling member which connects the forward and carrier portions of the vehicle with the new and improved bearing assembly incorporated therein. The assembly depicted in FIG. 3 is often commonly referred to as an articulation joint. Most of the parts of the device shown in FIG. 3 are generally similar to those depicted in FIG. 1 with the exception of size. The parts in FIG. 3 have been adjusted in size to accommodate the insertion of bearings 102 and 110 between the carrier body and the yoke member 30'. Yoke member 30' consists of straight arm portions 32', slanted arm portions 36', cross member 42', inclined arm portions 44', and cylindrical shaped portions 40' and 92. Portion 34 of yoke 30' is adapted to be rotatably journaled on the forward portion of the vehicle as hereinbefore described in relation to FIG. 1. Cylindrical portion 92 has a flange 94 extending thereabout and which is welded or otherwise suitably secured to inclined arm portions 44'. A washer or sleeve like member 96 is secured about cylindrical portion 92 by suitable means such as welding. A flange 98 is integrally formed with sleeves 96 to secure the bearing 102 as will be hereinafter described. If desired, the flange or lip 98 may have serrations formed therein to assist in securing the bearing 102.

As can be seen in FIG. 3, the bearing described in FIG. 2 is placed about cylindrical portion 92 of the yoke. The forward bearing, which will generally be referred to by reference numeral 102 has concentric sleeves 72, 76, and 78 with rubber bushings 84 and 86 inserted therebetween by means of bonding or an interference fit. A nut 100 is provided to secure bearing 102 against washer portion 96 which is rigidly secured to cylindrical portion 92 by any suitable means such as welding. As nut 100 is tightened, the serrations 82 formed in flange 80 will deform the flange 98 and thereby prevent member 78 from rotating relative to cylindrical portion 92. If desired, of course, serrations may be formed in flange 98 which correspond to the serrations in flange 80, and the same effect will be achieved. When the bearing 102 is suitably secured by nut 100, a retainer ring 104 secures the nut 100.

Mounted about cylindrical portion 40' is bearing 110 which is identical to bearing 102 and the bearing described in FIG. 2. A washer or sleeve-like member 112 is secured about cylindrical portion 40' and abuts shoulder 64'. A flange 114 is formed in sleeve-like member 112. As described hereinbefore, flange 114 will assist in preventing inner sleeve 78 from rotating by means of serrations or by means of deformation in response to the tightening of nut assembly 116.

Bearing 110 supports mounting bracket 60' which has a bore 62' and a top flat portion 66' on which the carrier body is placed. A bore 48' is located in cylindrical portion 40' through which drive shaft 88 is placed. As shown in FIG. 3, a yoke 90 is secured to drive shaft 88 which rotates about the longitudinal axis.

Yoke 90 is connected to a universal joint, not shown. Of course, shaft 88 is also connected to an additional universal joint at the opposite end of shaft 88. Drive shaft 88 is also supported by a pillow block bearing 120 which is rubber mounted. As can be seen in the drawing, ball bearings 124 rotate between a race which is secured to shaft 88 and rubber mounts 122.

Mounted upon forward bearing 102 is a brace 52' comprised of a platform portion 54', a backing portion 56', and a portion 59' which fits around bearing 102. The carrier body 118 is mounted on backing portion 54' to support the carrier body. As can be seen from the drawing, the brace member 52' and the support bracket 60 are not directly in contact with yoke member 30'. Instead, a pair of bearings 102 and 110 are placed therebetween and thereby preclude rubbing surfaces between parts which are rotatable relative to each other. This, obviously, reduces the amount of wear between such parts. As the carrier body 118 is caused to rotate in response to variable terrain, the outer sleeve 72 which is directly attached to brace 52' will rotate therewith. However, the inner sleeve 78 will remain stationary and only the rubber bushings 84 and 86 will be caused to flex. Two sets of stop members, as hereinbefore described in relation to FIG. 1, are also provided to restrict the amount of rotation about the roll and pitch axis.

Figure 4:
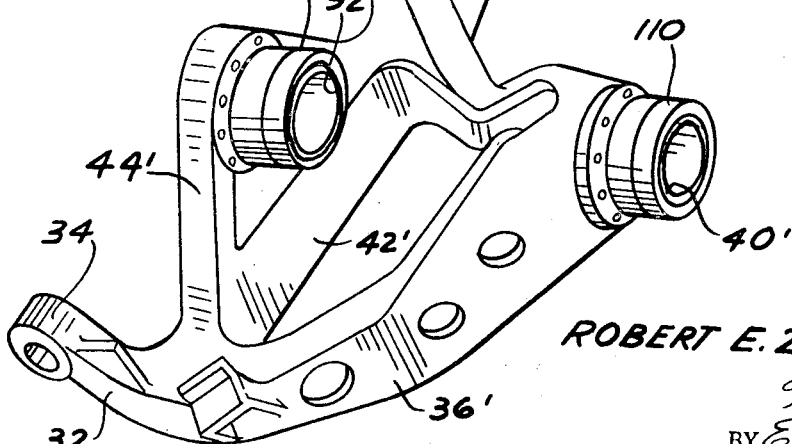
FIG. 4 is a perspective view of the coupling member which connects two relatively rotatable bodies and which incorporates the bearing assembly according to the present invention.

FIG. 4 represents a perspective view of the completed assembly of the coupling member which connects the forward and carrier body portions of the vehicle. This figure also represents the articulation joint with the new and improved bearing assembly incorporated therein. Bearing assemblies 102 and 110, as previously described in relation to FIG. 2, are mounted on cylindrical portions 92 and 40' respectively. For purposes of clarity, neither the drive shaft, the brace, the support bracket, nor the adapter plate, are shown in FIG. 4.

A stop 126 is placed on each of the arms 32. When the carrier body rotates about the longitudinal or roll axis 128 beyond a minimum roll angle, the stops 126 are caused to interrupt the carrier body section 12. A cushioning member, not shown, which is made of any suitable material such as rubber is mounted on stops 126 to absorb shock. A lockout support member 125 is provided to enable a rigid truss to be installed between cab 10 and carrier body 12 so that cab 10 and body 12 may be unitized. A unitary structure is particularly desirable in the event of a flat tire or in the event that the vehicle must be air dropped.

In operation, the torsilastic bearing system has eliminated all abrasive surfaces in the bearing system. The inner sleeve portion of the bearing 78 remains fixed to the yoke assembly 30' while the outer sleeve portion of the bearing 72 remains fixed to the brace member 52' or the support mount 60'. As the carrier body which is mounted on adapter plate 118 rotates relative to the forward body or cab portion 10 the brace 52' and outer sleeve 72 will be caused to rotate therewith. However, sleeve 78 will not rotate, but instead, the rubber bushings inserted between the inner and outer sleeves will be caused to flex. Obviously, as can be seen from the drawing, the inter wear caused by brace 42' resting directly on cylindrical portion 92 of yoke 30' has been eliminated. If the vehicle is involved in muddy terrain and/or other environment which can cause contamination of the coupling member, the bearing assembly will not be affected thereby because of the elimination of any rubbing surfaces. This arrangement has resulted in a much longer life system. The use of two rubber bushings as shown in the drawing will permit 30° body roll about the longitudinal roll axis 11. If desired, of course, additional layers of rubber bushings and corresponding sleeves may be utilized to increase the amount of body roll providing sufficient space is available to accommodate same. If it is desired to decrease carrier body roll, this may conveniently be accomplished by increasing the layers of bushings and sleeves within the given envelope of dimensions. This system has also eliminated the requirement for any lubrication within the bearing assembly. This necessarily results in a much more efficient and less expensive device.

Thus, what has been described is an assembly which will totally eliminate bearing wear in an articulation joint or coupling member which connects to bodies which are rotatable relative to each other. The assembly further provides for improved side slope stability of an articulated vehicle. The bearing assembly as installed in the coupling member provides for improved swimming stability of the vehicle in that it prevents uncontrolled roll of the vehicle. A further quality which is inherent in the bearing assembly is a provision for cushioning of thrust loads on the articulation joint. If, for instance, the vehicle is caused to stop abruptly, the carrier body portion of the vehicle will tend to move forward against the plate 56' of brace 52' and support bracket 60'. This course will be directly transmitted to the bearing assemblies 102 and 110. The outer sleeves 72 will tend to move forward with their corresponding mounting member 52' and 60', however the inner sleeves 78 will remain fast on cylindrical portions 92 and 40', respectively, Thus, it can be seen that the bearing wear caused by thrust forces will also be removed because of the elimination of rubbing parts. The force will be absorbed by the rubber bushings which are placed between the inner and outer sleeves. Moreover, because of the flexible nature of the bushings, the thrust force will be cushioned. As was mentioned previously, the swimming stability will also be improved because of the limited roll permitted by the bearing assembly. In previous vehicles, the carrier body was permitted to turn without restriction. However, with the new and improved bearing assembly, the amount of roll permitted can be designed to fit the particular needs. As shown in the drawing, the two layer bushing system described herein permits subtantially a 30° roll in either direction about the longitudinal roll axis. Thus the carrier body will not be caused to sway when it is in the water.

While the bearing assembly has been described with reference to generally three sleeves and two bushing members, it is to be understood that any number of sleeve and/or bushing may be utilized.

While the invention has been described with reference to adaptation to an articulated vehicle, it is to be understood that the invention may be utilized in any system which has two bodies which are rotatable relative to each other. While the invention has been further described with reference to an articulation joint, it is to be understood that the bearing system may be utilized in any environment which requires the elimination of two or more rubbing surfaces.

Since it is obvious that many changes and modifications can be made in the above described details without departing from the nature and spirit of the invention, it is to be understood that the invention is ont limited to said details.

I claim:

1. A bearing assembly for connecting a first body and second body together comprising a first outer sleeve, a second intermediate sleeve and a third inner sleeve arranged in concentric relation; a first flexible bushing mounted between said outer and intermediate sleeves and a second flexible bushing mounted between said intermediate and inner sleeves; said first bushing having a substantial interference fit with said outer and intermediate sleeves and said second bushing having a substantial interference fit with said inner and intermediate sleeves; said outer and inner sleeves having flanges extending transversely thereto; said flange of said outer sleeve operative to assist in securing said outer sleeve to the first body, and said flange of said inner sleeve having serrations formed therein to prevent movement of said inner sleeve relative to the second body.

2. In a coupling system for connecting a first body and second body together having a yoke means the improvement comprising at least one bearing mounted intermediate said second body and said yoke means, said bearing comprising an outer sleeve supporting said second body and an inner sleeve mounted on said yoke assembly which is connected to said body, said inner sleeve having a flange extending transversely thereto having serrations formed therein, and flexible bushing means mounted between said inner and outer sleeves such that as the said second body angularly rotates and thereby causes the outer sleeve to rotate the yoke assembly remains stationary and said bushing is subjected to torsional shear.

3. The coupling system according to claim 2 wherein a brace encompasses said outer sleeve and supports said second body and said outer sleeve has a flange formed therein to enable said bearing to be secured to said brace.

4. The coupling system according to claim 2 wherein a second bearing is mounted in spaced relation to said first bearing and intermediate said yoke means and said carrier body.

5. The coupling system as set forth in claim 2 wherein said bearing further comprises an intermediate sleeve concentric with and intermediate said inner and outer sleeves and said flexible bushing means comprises first and second bushings, said first bushing being mounted intermediate said outer and intermediate sleeves and said second bushing being mounted intermediate said second and third sleeves.

6. The coupling system according to claim 5 wherein said first bushing has a substantial interference fit with said outer and second sleeves and said intermediate bushing has a substantial interference fit with said intermediate inner sleeves.

7. A coupling for connecting a forward and a carrier body comprising a yoke, first and second bearings, a brace, a washer, and a mounting bracket, said yoke having first and second cylindrically shaped portions, a first portion of said brace surrounding said first cylindrically shaped portion and a second portion of said brace supporting said carrier body, said first bearing being located between said brace and said first cylindrical portion, said second bearing being mounted between said second cylindrically shaped portion of said yoke and said mounting bracket, said mounting bracket being secured to said carrier body, said first and second bearing each comprising first outer, second intermediate and third concentrically spaced sleeves and first and second concentrically spaced rubber bushings, said first bushing having a substantial interference fit with said outer and intermediate sleeves and said second bushing having a substantial interference fit with said intermediate and inner sleeves, said outer sleeve having a flange thereon for mounting to said brace, said inner sleeve having a flange extending transversely thereto having serrations formed therein which intermesh with a portion of said washer which is secured about said first cylindrical shaped portion of said yoke such that as the carrier body rotates causing the outer sleeve to rotate, the inner sleeve remains stationary and the rubber bushings are subjected to torsional shear.

References Cited

UNITED STATES PATENTS

| 1,761,669 | 6/1930 | Howard et al. | 180—50 |
| 2,051,864 | 8/1936 | Knox et al. | 287—85 XR |
| 2,937,886 | 5/1960 | Poole | 280—492 |
| 2,940,785 | 6/1960 | Haushalter | 287—85 |

FOREIGN PATENTS

| 441,480 | 1/1936 | Great Britain. |
| 286,604 | 2/1953 | Switzerland. |

BENJAMIN HERSH, Primary Examiner

M. L. SMITH, Assistant Examiner

U.S. Cl. X.R.

180—49; 287—85; 308—26